(12) United States Patent
Jadhav et al.

(10) Patent No.: US 12,465,743 B2
(45) Date of Patent: Nov. 11, 2025

(54) FLUID CONNECTOR ASSEMBLY WITH NEUTRAL FLUID DISPLACEMENT THAT LIMITS CONNECTOR DAMAGE

(71) Applicant: CAREFUSION 303, INC., San Diego, CA (US)

(72) Inventors: Amarsinh Deeliprao Jadhav, Bangalore (IN); Sumit Rajpal, Panipat (IN); Kaushik Suman, Jharkhand (IN); Abin Austin, Thrissur (IN); Kanjimpuredathil Muralikrishna Menon, Bangalore (IN)

(73) Assignee: CAREFUSION 303, INC., San Diego, CA (US)

( * ) Notice: Subject to any disclaimer, the term of this patent is extended or adjusted under 35 U.S.C. 154(b) by 0 days.

(21) Appl. No.: 17/982,718

(22) Filed: Nov. 8, 2022

(65) Prior Publication Data

US 2024/0151339 A1 May 9, 2024

(51) Int. Cl.
*A61M 39/26* (2006.01)
*A61M 39/10* (2006.01)
(Continued)

(52) U.S. Cl.
CPC ............ *A61M 39/26* (2013.01); *A61M 39/10* (2013.01); *A61M 2039/1072* (2013.01);
(Continued)

(58) Field of Classification Search
CPC ............ A61M 39/26; A61M 2039/267; A61M 2039/263; A61M 2039/261; A61M 39/10;
(Continued)

(56) References Cited

U.S. PATENT DOCUMENTS 5,280,876 A * 1/1994 Atkins .................. A61M 39/26
604/905
5,520,666 A * 5/1996 Choudhury ......... A61M 39/045
604/905
(Continued)

OTHER PUBLICATIONS

International Search Report and Written Opinion for Application No. PCT/US2023/032210, dated Dec. 15, 2023, 11 pages.
(Continued)

*Primary Examiner* — David Colon-Morales
(74) *Attorney, Agent, or Firm* — MASCHOFF BRENNAN

(57) ABSTRACT

Fluid connectors assemblies that provide neutral fluid displacement without overlapping connectors are disclosed. A fluid connector assembly may include a housing and a pair of connectors (e.g., luers) coupled with the housing. A compressible member (e.g., bellow) is located within the housing. The first connector and the second connector each include a post with an opening. The compressible member can seal off the opening of the first connector from fluid entry. However, when the post of the second connector is inserted into the housing, the post of the second connector displaces the compressible member, causing the compressible member to uncover the opening, and further causes the compressible member to open in another location and receive fluid. Further, the compressible member seals each of the first connector and the second connector and forms a fluid path through the posts and the compressible member, with the seals regulating fluid flow.

19 Claims, 8 Drawing Sheets

(51) Int. Cl.
*A61M 39/24* (2006.01)
*A61M 39/18* (2006.01)

(52) U.S. Cl.
CPC ..... *A61M 39/18* (2013.01); *A61M 2039/2426* (2013.01); *A61M 2039/267* (2013.01); *A61M 2205/0216* (2013.01); *F16L 2201/20* (2013.01)

(58) Field of Classification Search
CPC .. A61M 2039/1072; A61M 2039/2426; A61M 2039/2433; A61M 2205/0216; A61M 39/18; F16L 37/38; F16L 2201/20; F16L 2201/44
See application file for complete search history.

(56) References Cited

U.S. PATENT DOCUMENTS

| | | | | |
|---|---|---|---|---|
| 5,676,346 | A * | 10/1997 | Leinsing | A61M 39/26 |
| | | | | 604/905 |
| 5,814,024 | A * | 9/1998 | Thompson | A61M 39/045 |
| | | | | 604/86 |
| 5,820,601 | A * | 10/1998 | Mayer | A61M 39/26 |
| | | | | 604/533 |
| 5,820,614 | A * | 10/1998 | Erskine | F16L 55/1007 |
| | | | | 604/905 |
| 6,089,541 | A * | 7/2000 | Weinheimer | A61M 39/26 |
| | | | | 604/905 |
| 6,299,131 | B1 | 10/2001 | Ryan | |
| 6,706,022 | B1 * | 3/2004 | Leinsing | A61M 39/26 |
| | | | | 604/247 |
| 6,802,490 | B2 * | 10/2004 | Leinsing | A61M 39/26 |
| | | | | 604/905 |
| 6,808,161 | B1 * | 10/2004 | Hishikawa | F16L 29/005 |
| | | | | 604/167.04 |
| 7,044,441 | B2 | 5/2006 | Doyle | |
| 7,396,348 | B2 * | 7/2008 | Newton | A61M 39/26 |
| | | | | 604/256 |
| 7,841,581 | B2 * | 11/2010 | Thorne, Jr. | A61M 39/26 |
| | | | | 251/149.6 |
| 7,914,502 | B2 * | 3/2011 | Newton | A61M 39/045 |
| | | | | 604/246 |
| 8,029,472 | B2 * | 10/2011 | Leinsing | A61M 39/045 |
| | | | | 604/164.01 |
| 8,048,038 | B2 * | 11/2011 | Guala | A61M 39/10 |
| | | | | 251/149.6 |
| 8,343,113 | B2 * | 1/2013 | Hokanson | A61M 39/045 |
| | | | | 604/256 |
| 9,234,616 | B2 * | 1/2016 | Carrez | A61M 39/10 |
| 9,440,060 | B2 | 9/2016 | Fangrow | |
| 9,750,926 | B2 | 9/2017 | Lopez et al. | |
| 9,839,774 | B2 * | 12/2017 | Bonaldo | A61M 39/26 |
| 10,179,231 | B2 * | 1/2019 | Nelson | A61M 39/26 |
| 10,625,070 | B2 * | 4/2020 | Schlitt | A61M 39/26 |
| 10,780,260 | B2 * | 9/2020 | Jones | A61M 39/24 |
| 11,311,709 | B2 * | 4/2022 | Mansour | A61M 39/22 |
| 11,679,246 | B2 * | 6/2023 | Lynn | A61M 39/10 |
| | | | | 604/256 |
| 11,690,993 | B1 * | 7/2023 | Dikeman | A61M 39/22 |
| | | | | 604/154 |
| 11,738,189 | B2 * | 8/2023 | Kakinoki | A61M 39/1011 |
| | | | | 29/428 |
| 2016/0129235 | A1 | 5/2016 | Ryan | |

OTHER PUBLICATIONS

Written Opinion from the International Preliminary Examining Authority for Application No. PCT/US2023/032210, dated Jun. 18, 2024, 5 pages.

International Preliminary Report on Patentability from the International Preliminary Examining Authority for Application No. PCT/US2023/032210, dated Feb. 18, 2025, 15 pages.

* cited by examiner

FLUID CONNECTOR ASSEMBLY WITH NEUTRAL FLUID DISPLACEMENT THAT LIMITS CONNECTOR DAMAGE

TECHNICAL FIELD

The present disclosure relates generally to medical fluid connectors and, more particularly, to neutral displacement needle-free connectors that maintain separation between a central post and a luer to reduce the likelihood of the luer breaking the central post.

BACKGROUND

Needle-free connectors, including neutral displacement needle-free connectors, offer a solution for providing medical fluid to patients. In an exemplary embodiment, a needle-free connector assembly promotes fluid transmission between a medical fluid supply and a catheter line. The medical fluid supply and the catheter line are secured to respective luers that are secured to a connector body. To transmit fluid, the luer connected to the medical supply is inserted into the connector body and overlaps a central post of the luer connected to the catheter line.

The overlapping between the luer and the central post can lead to issues. For example, movement of the luer relative to the central post, or vice versa, can cause contact between the luer and the central post, leading to increased risk of cracking or breaking the central post. When this occurs, the damaged area leads to fluid leakage, resulting in fluid loss and contamination. Additionally, luers used with neutral displacement connectors are often non-compliant luers, making them susceptible to fluid leakage.

SUMMARY

In accordance with at least some embodiments disclosed herein is the realization that components used with neutral fluid displacement, such as a luer and a post, can break when overlapping and coming into contact with each other, which can result in medical fluid leakage and reduced medical delivery to a patient. When a broken component is located in a connector body, it may not be readily present to a medical professional that the component is broken, leading to delayed response times.

Aspects of the present disclosure provide a needle-free fluid connector assembly that provides a neutral fluid displacement connection while minimizing the risk of breaking one or more components of the needle-free fluid connector assembly. The neutral fluid displacement limits or prevents fluid from entering a catheter lumen during connection or disconnection of a medical fluid. Based on the positioning of respective posts of the connectors of the fluid connector assembly, the posts do not overlap each other.

Accordingly, aspects of the present disclosure provide a fluid connector assembly comprising a housing, comprising a first end, a second end, and an internal volume fluidly connected to the first end and the second end, and a compressible member disposed in the internal volume, the compressible member comprising a cavity; a first connector secured with the housing at the first end, the first connector comprising: a post located in the cavity, and an opening formed in the post; and a second connector, when secured with the housing at second end, displaces the compressible member and forms a seal that causes a fluid entering the second connector to pass through the opening.

Some instances of the present disclosure provide a fluid connector assembly comprising a fluid connector assembly, comprising a housing comprising an internal volume; a compressible member disposed in the internal volume, the compressible member comprising: an inner wall, and a cavity defined by the inner wall; a first connector secured with the housing, the first connector comprising a post located in the cavity, and an opening formed in the post, the opening covered by the inner wall; and a second connector, wherein: a first position of the second compressible member comprises the inner wall covering the opening, and a second position of the second compressible member comprises the inner wall uncovering the opening based upon the second connector.

Some instances of the present disclosure provide a method for regulating an intravenous fluid, by a fluid connector assembly, comprising providing a housing, the housing comprising an in internal volume; receiving, at the housing, a compressible member in the internal volume; receiving, at a first end of the housing, a first connector, the first connector comprising a post and an opening formed in the post; receiving, at a second end of the housing, a second connector; displacing, based on receiving the second connector, the compressible member; and forming, based on the displacing of the compressible member, a seal that causes the intravenous fluid that enters the second connector to pass through the opening.

Accordingly, the present application addresses several operational challenges encountered in prior neutral displacement connector assemblies that are susceptible to breaking.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures.

DETAILED DESCRIPTION

In the following detailed description, numerous specific details are set forth to provide a full understanding of the subject technology. It should be understood that the subject technology may be practiced without some of these specific details. In other instances, well-known structures and techniques have not been shown in detail so as not to obscure the subject technology.

Further, while the present description sets forth specific details of various embodiments, it will be appreciated that the description is illustrative only and should not be construed in any way as limiting. Additionally, it is contemplated that although particular embodiments of the present disclosure may be disclosed or shown in the context of an IV set, such embodiments can be used in other fluid conveyance systems. Furthermore, various applications of such embodiments and modifications thereto, which may occur to those who are skilled in the art, are also encompassed by the general concepts described herein.

In accordance with some embodiments, the present disclosure includes various features and advantages of maintaining separation between a post and luer, thus minimizing the likelihood of damaging the post and/or the luer.

Figure 1:
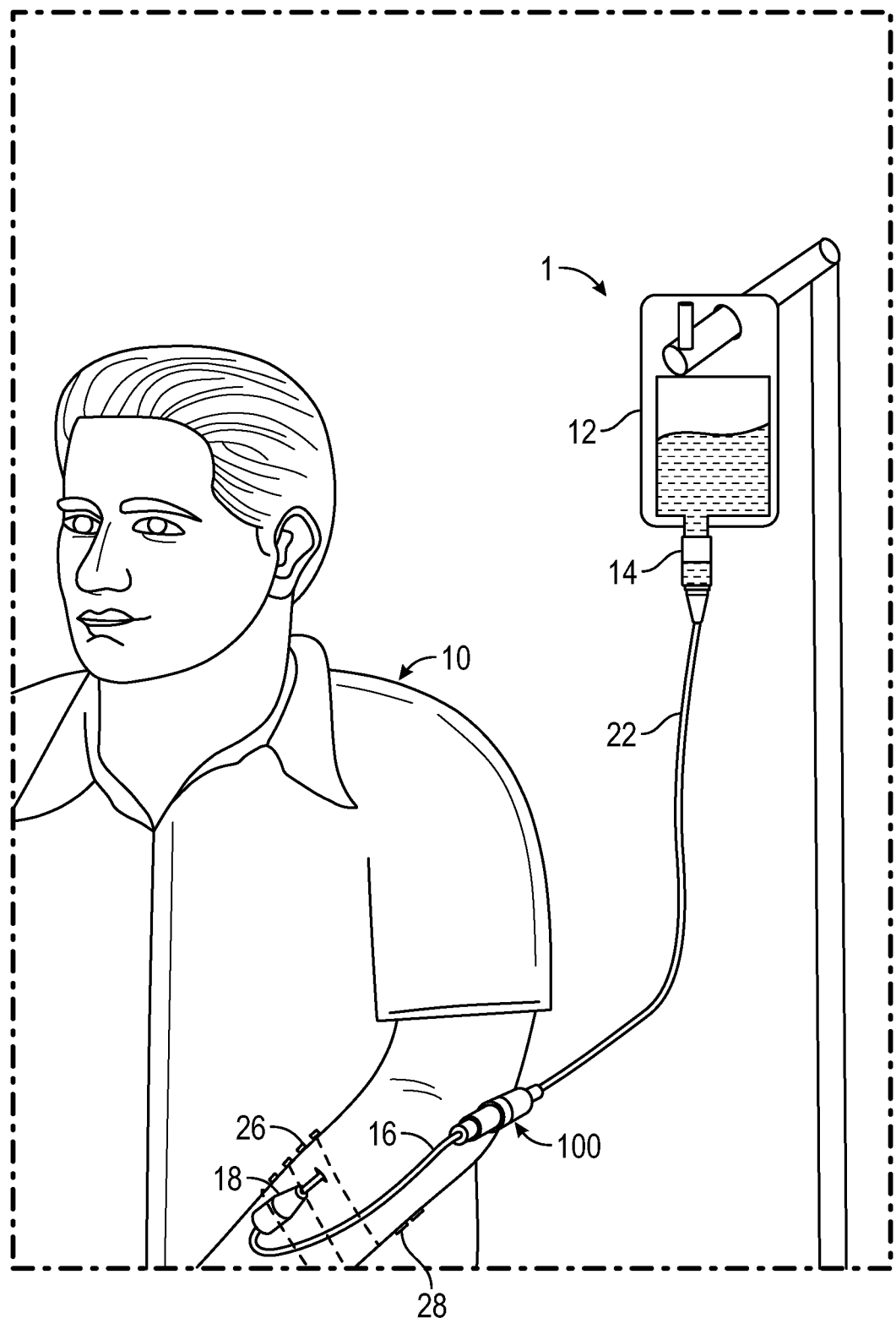
FIG. 1 illustrates an IV set coupled to a patient, in accordance with aspects of the present disclosure.

Referring now to the figures, FIG. 1 illustrates an IV set 1 coupled to a patient 10, in accordance with aspects of the present disclosure. The IV set 1 includes a medicament bag 12, a drip chamber 14, and tubing 22. The tubing 22 extends between the drip chamber 14 and a fluid connector assembly 100 of the IV set 1. To resist unintended dislodgement or disconnection of the tubing 16 or the catheter 18 from the patient, tape 26 is placed over the tubing 16 and the catheter 18, so that the tape 26 engages the tubing 16, the catheter 18, and the patient 10.

Figure 2:
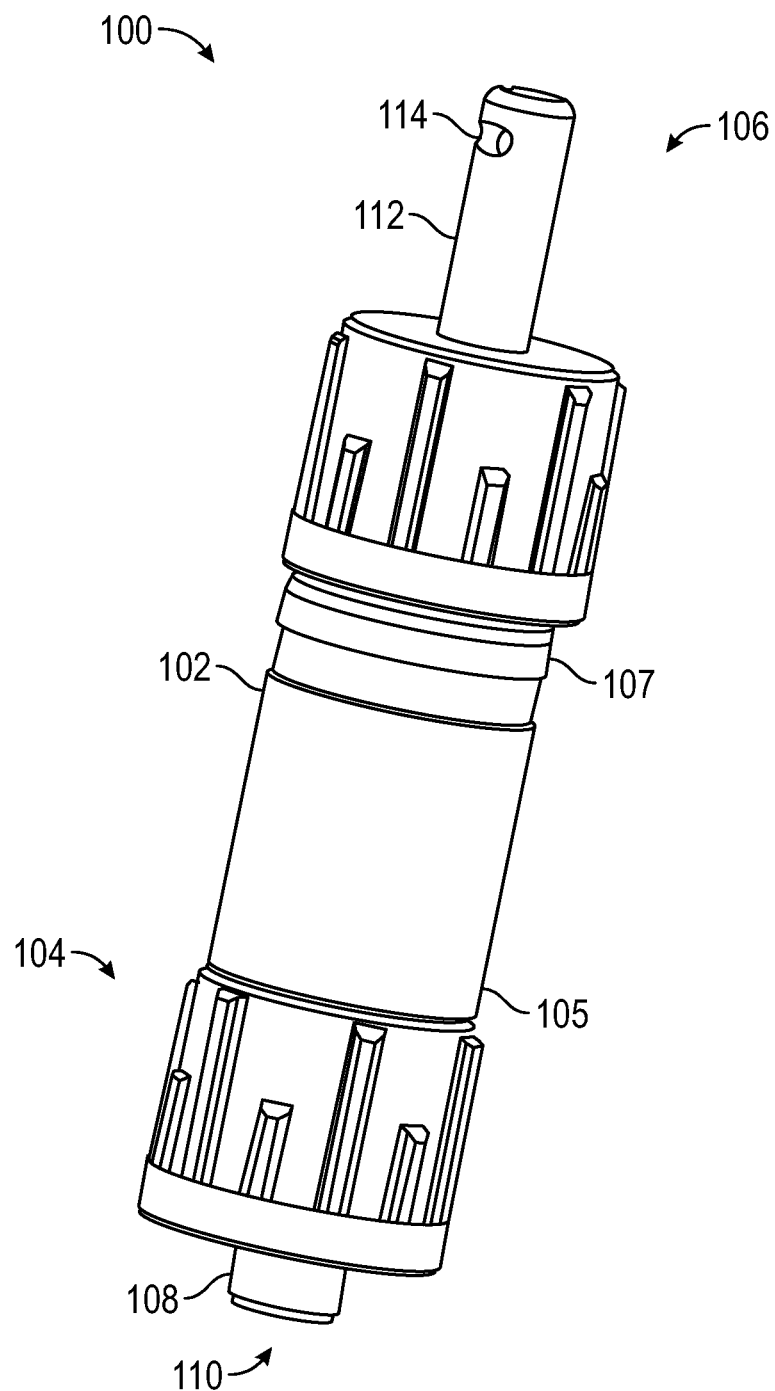
FIG. 2 illustrates a perspective view of a fluid connector assembly for in use with an IV set, in accordance with aspects of the present disclosure.

FIG. 2 illustrates a perspective view of a fluid connector assembly 100 for use with an IV set, in accordance with aspects of the present disclosure. The fluid connector assembly 100 is designed for use in medical applications, such as the IV set 1 (shown in FIG. 1) as well as other IV medical fluid delivery applications using catheters, including PIVC catheters, as non-limiting examples.

The fluid connector assembly 100 provides a regulated fluid path throughout the components of the fluid connector assembly 100. As shown, the fluid connector assembly 100 includes a housing 102 used as a central body to carry and/or connect with one or more components. The housing 102 may include a cylindrical, or generally cylindrical, body. Additionally, the housing 102 may include a hollow, or generally hollow, body that forms an internal volume to receive one or more components.

The fluid connector assembly 100 further includes connector 104 and a connector 106, each of which can couple, including mechanically couple, with the housing 102. As shown, the housing 102 includes an end 105 and an end 107, and the connector 104 and the connector 106 is connected to the end 105 and the end 107, respectively. The connectors 104 and 106 may be referred to as a first connector and a second connector, respectively. Also, the end 105 and the end 107 may be referred to as a first end and a second end, respectively. However, "first" and "second" may be interchangeable for the connectors 104 and the 106, as well as the ends 105 and 107. Also, each of the connectors 104 and 106 may be referred to as a medical connector. In some embodiments, the connector 106 is connected to a medical fluid, such as the medicament bag 12 (shown in FIG. 1). Further, in some embodiments, the connector 104 is connected to a catheter line (e.g., tubing 16 in FIG. 1) that delivers the medical fluid to a catheter, such as the catheter 18 (shown in FIG. 1). Also, each of the connectors 104 and 106 may take the form of a luer designed to prevent fluid leakage through their respective connections with the housing 102. In this regard, each of the connectors 104 and 106 may conform to standards established by the International Organization for Standards ("ISO") to improve patient safety, minimize medical fluid leakage, and reduce misconnection with other connection devices.

The connector 104 includes a post 108 that includes a channel fluidly connected to an opening (not shown in FIG. 2) at the end of the post 108. As a result, the fluid outlet 110 acts as a fluid transmission location for the fluid connector assembly 100. Also, the connector 106 includes a post 112 that includes an opening 114. The opening 114 acts as a fluid inlet of the fluid connector assembly 100. Accordingly, the opening 114 acts as a fluid receiving location for the fluid connector assembly 100. Each of the posts 108 and 112 can pass centrally, or at least approximately centrally, through the connectors 104 and 106, respectively. The posts 108 and 112 may be referred to as a first post and a second post, respectively. However, "first" and "second" may be used interchangeably. Also, each of the posts 108 and 112 includes a cylindrical, or generally cylindrical, shape. However, other shapes are possible.

Figure 3:
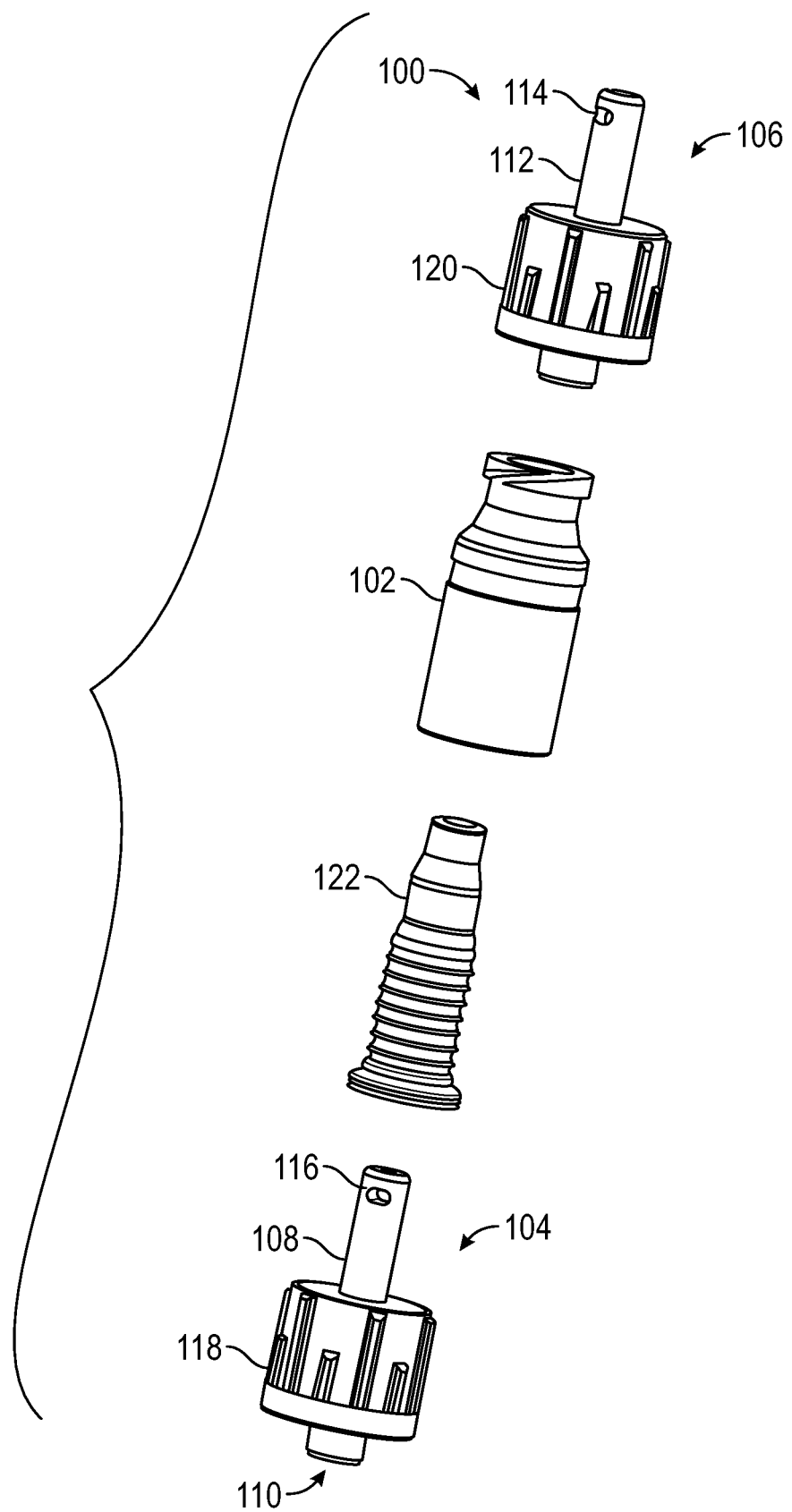
FIG. 3 illustrates an exploded view of the fluid connector assembly, showing additional features, in accordance with aspects of the present disclosure.

FIG. 3 illustrates an exploded view of the fluid connector assembly 100, showing additional features, in accordance with aspects of the present disclosure. The connector 104 includes an opening 116 formed in the post of the connector 104. The opening 116 represents a fluid inlet for the connector 104. The opening 116 is fluidly connected to the fluid outlet 110. Additionally, each of the connectors 104 and 106 include connector portions integrated with the respective posts. For example, the connector 104 includes a connector portion 118 and the connector 106 includes a connector portion 120. As shown in FIG. 3, the posts 108 and 112 extend through opposing ends of the connector portions 118 and 120, respectively.

Additionally, the fluid connector assembly 100 includes a compressible member 122. In some embodiments, the compressible member 122 includes a bellow that can elastically compress. Accordingly, the compressible member 122 can compress by an external force (or by multiple external forces) and subsequently return to its original, uncompressed state when the external force is removed. The compressible member 122 is designed to regulate fluid flow through the fluid connector assembly 100. Accordingly, the compressible member 122 acts as a valve for the fluid connector assembly 100. This will be shown in detail below.

Figure 4:
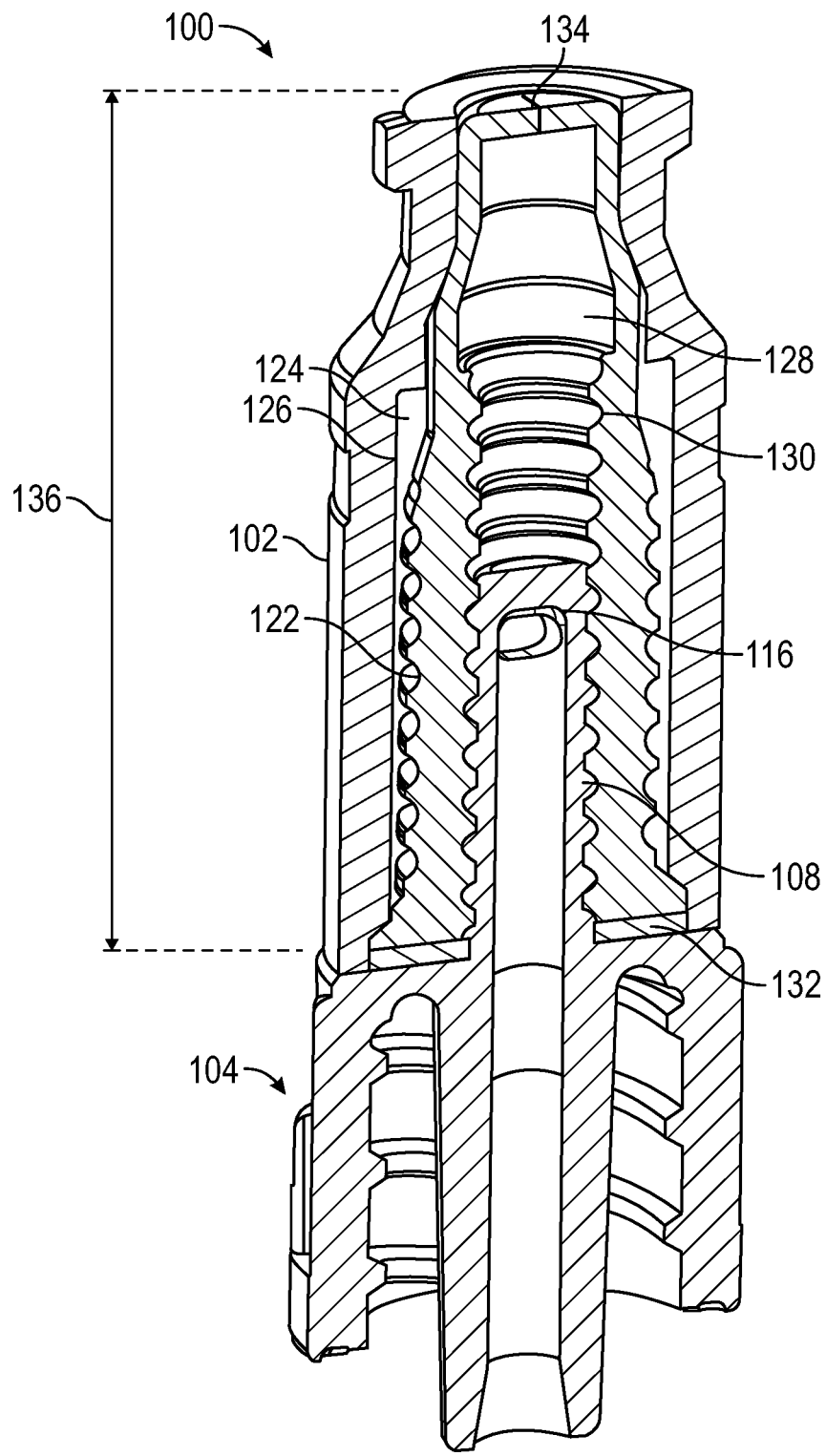
FIG. 4 illustrates a partial cross-sectional view of the fluid connector assembly, showing the connector and the compressible member positioned in the housing, in accordance with aspects of the present disclosure.

FIG. 4 illustrates a partial cross-sectional view of the fluid connector assembly 100, showing the connector 104 and the compressible member 122 positioned in the housing 102, in accordance with aspects of the present disclosure. Based on the hollow design, the housing 102 includes an internal volume 124 that forms a three-dimensional space or void in the housing 102, thus allowing the housing 102 to receive one or more components. For example, the compressible member 122 and a portion of the post 108 of the connector 104 are positioned in the internal volume 124. The housing 102 further includes an inner surface 126, or wall, that at least partially defines the internal volume 124 of the housing 102.

Additionally, a portion of the post 108 is located in the compressible member 122. In this regard, the compressible member 122 includes an internal volume 128 through which the portion of the post 108 lies. The compressible member 122 further includes an inner surface 130, or wall, that at least partially defines the internal volume 128 of the compressible member 122. Also, as shown in FIG. 4, the inner surface 130 of the compressible member 122 surrounds the post 108, including the opening 116 of the post 108. Moreover, the inner surface 130 of the compressible member 122 is in contact with the post 108. As a result of this relationship between the inner surface 130 and the opening 116, the compressible member 122 prevents fluid flow through the opening 116. In some embodiments, the compressible member 122 includes a septum 132 that provides a liquid-sealing structure that forms a seal between the post 108 and the compressible member 122 to prevent fluid leakage between the post 108 and the compressible member 122. In some embodiments, the septum 132 can be integrated with the compressible member 122, and in some embodiments, the septum 132 may be separated from the compressible member 122.

The compressible member 122 further includes a slit 134, or opening, that separates based on an applied force. As shown in FIG. 4, the slit 134 is closed and may resist fluid flow therethrough. However, when the connector 106 (shown in FIG. 3) is coupled with the housing 102, the post 112 of the connector 106 can engage the compressible member 122, causing the slit 134 to open based upon the applied force provided by the post 112.

Further, the compressible member 122 includes a dimension 136 that defines a lengthwise dimension of a major axis of the compressible member 122. When no external force is acting on the compressible member 122 to displace (e.g., compress) the compressible member 122, the lengthwise dimension of the compressible member 122 is defined by the dimension 136. Accordingly, the dimension 136 of the compressible member 122 represents an initial dimension, and the size and shape of the compressible member 122 shown in FIG. 4 represents an initial size and shape.

Figure 5:
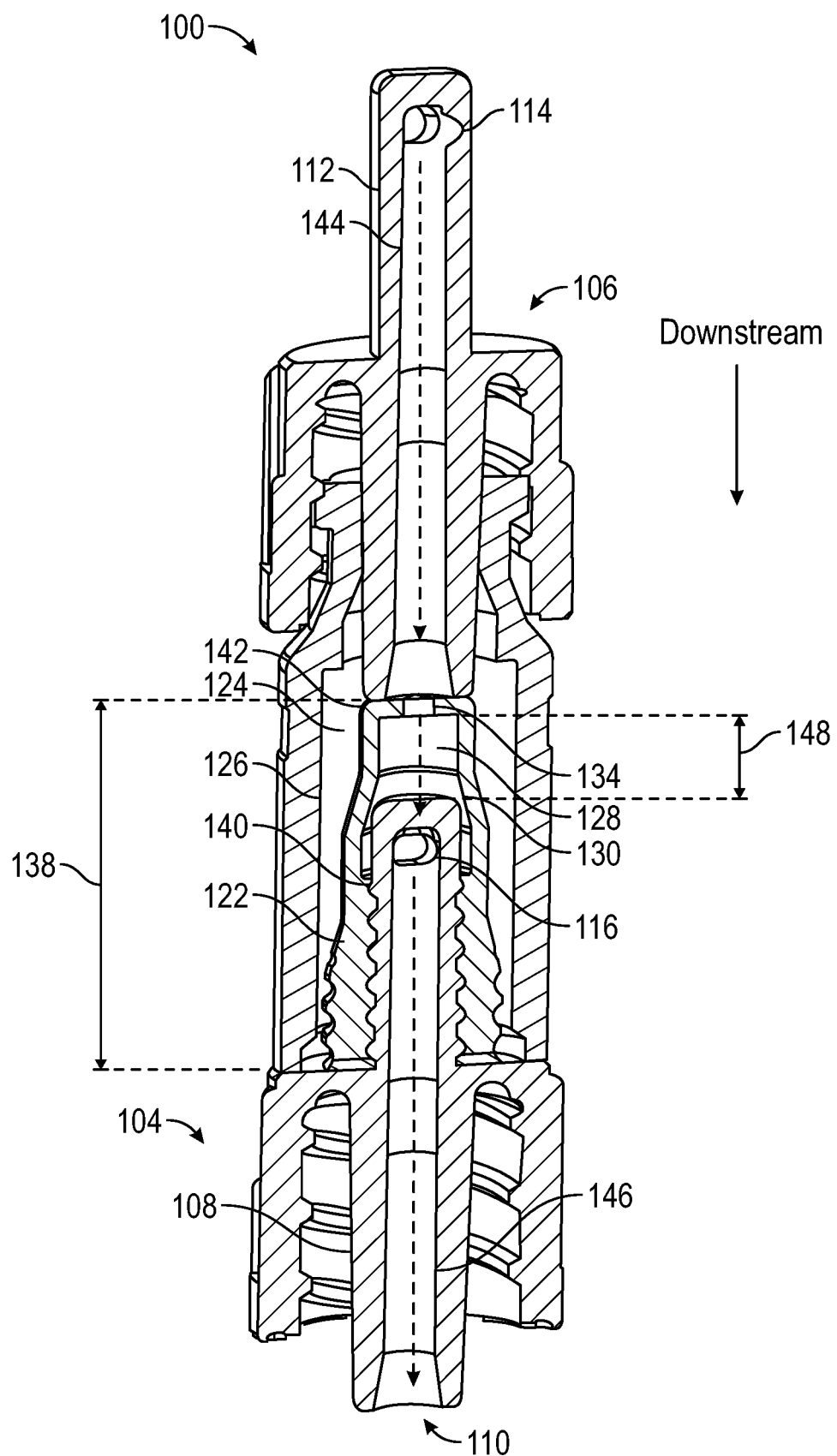
FIG. 5 illustrates a partial cross-sectional view of the fluid connector assembly, showing the connector inserted into the housing, in accordance with aspects of the present disclosure.

FIG. 5 illustrates a partial cross-sectional view of the fluid connector assembly 100, showing the connector 106 inserted into the housing 102, in accordance with aspects of the present disclosure. As shown, the post 112 of the connector 106 is at least partially disposed in the housing 102 and engages the compressible member 122, causing the compressible member 122 to displace. For example, the compressible member 122 compresses and reduces to a dimension 138 that is less than the dimension 136 (the original, uncompressed dimension shown in FIG. 4). Based on the displacement of the compressible member 122, each of the internal volume 128 and the inner surface 130 of the compressible member 122 transforms. For example, the internal volume 128 reduces and expands around the opening 116 of the post 108 of the connector 104, and the inner surface 130 of the compressible member 122 no longer engages the post 108 at a location surrounding the opening 116 of the post 108. Further, the displacement of the compressible member 122 causes the slit 134 of the compressible member 122 to open. As a result, fluid passing through the slit 134 of the compressible member 122 can further pass through the opening 116 of the post 108. Accordingly, in the displaced configuration of the compressible member 122, the opening 116 of the post 108 is fluidly connected to the slit 134 of the compressible member 122.

Based upon the engagement between the compressible member 122 and the connectors 104 and 106, several seals are formed. For example, a seal 140 is formed between the compressible member 122 and the post 108. The seal 140 prevents fluid entering the internal volume 128 of the compressible member 122 from passing through a location between the post 108 and the compressible member 122, and the fluid entering the compressible member 122 downstream passes through the opening 116. Also, a seal 142 is formed between the compressible member 122 and the post 112. The seal 142 prevents fluid entering a channel 144 of the post 112 of the connector 106 from passing through a location between the post 112 and the compressible member 122, and the fluid in the channel 144 passes through the slit 134. The seals 140 and 142 may be referred to as a first seal and a second seal, respectively. However, "first" and "second" may be interchangeable.

The arrows with dotted lines show a fluid path through the fluid connector assembly 100. When a medical fluid line is connected to the connector 106, the fluid enters the opening 114 (i.e., fluid inlet) of the connector 106. The fluid can then pass through the channel 144 of the post 112 and enter the compressible member 122 through the slit 134 of the compressible member 122. The fluid can then enter the opening 116 of the post 108, and subsequently pass through a channel 146 of the post 108. The fluid can exit the fluid connector assembly 100 through the fluid outlet 110 formed in the post 108.

Based on the fluid flow through the fluid connector assembly 100, the fluid connector assembly 100 provides neutral fluid displacement in which blood and/or other fluids is/are prevented, or at least substantially limited, from entering a catheter lumen (not shown) positioned in the connector 104 and fluidly connected to the fluid connector assembly 100 during a connector or disconnection between the fluid connector assembly 100 and the catheter lumen, or when the medical fluid line is connected or disconnected to the connector 106. However, unlike traditional neutral fluid displacement connector assemblies, the post 108 of the connector 104 is not inserted into the post 112 of the connector 106. Put another way, the post 112 of the connector 106 does not overlap the post 108 of the connector 104. As shown in FIG. 5, a gap 148, or separation, exists between the post 108 and the post 112. Accordingly, when the connectors 104 and 106 are coupled with the housing 102, the posts 108 and 112 are separated by the gap 148 in a direction along a longitudinal axis that passes through the housing 102, the connectors 104 and 106, and the compressible member 122.

Despite the gap 148, the seals 140 and 142 promote fluid flow through, and not around, the compressible member 122. For example, the seal 140 urges fluid exiting the compressible member 122 into the opening 116 of the post 108 and prevents fluid flowing outside the post 108 and into the internal volume 124 of the housing 102. Also, the seal 142 urges fluid exiting the channel 144 of the post 112 through the slit 134 of the compressible member 122 and prevents fluid flowing outside the compressible member 122 and into the internal volume 124 of the housing 102. As a result, fluid entering the fluid connector assembly 100 remains within the connector 106, the compressible member 122, and the connector 106, and does not contact the inner surface 126 of the housing 102. Based on the features and functionality, the fluid connector assembly 100, unlike positive fluid displacement connector assemblies, does not force fluid into the catheter lumen during a connection or disconnection event. Also, the fluid connector assembly 100, unlike negative fluid displacement connector assemblies, does not allow fluid back into the catheter lumen during a connection or disconnection event. Accordingly, the fluid connector assembly 100 includes a neutral displacement connector assembly, without overlapping posts.

Figure 6:
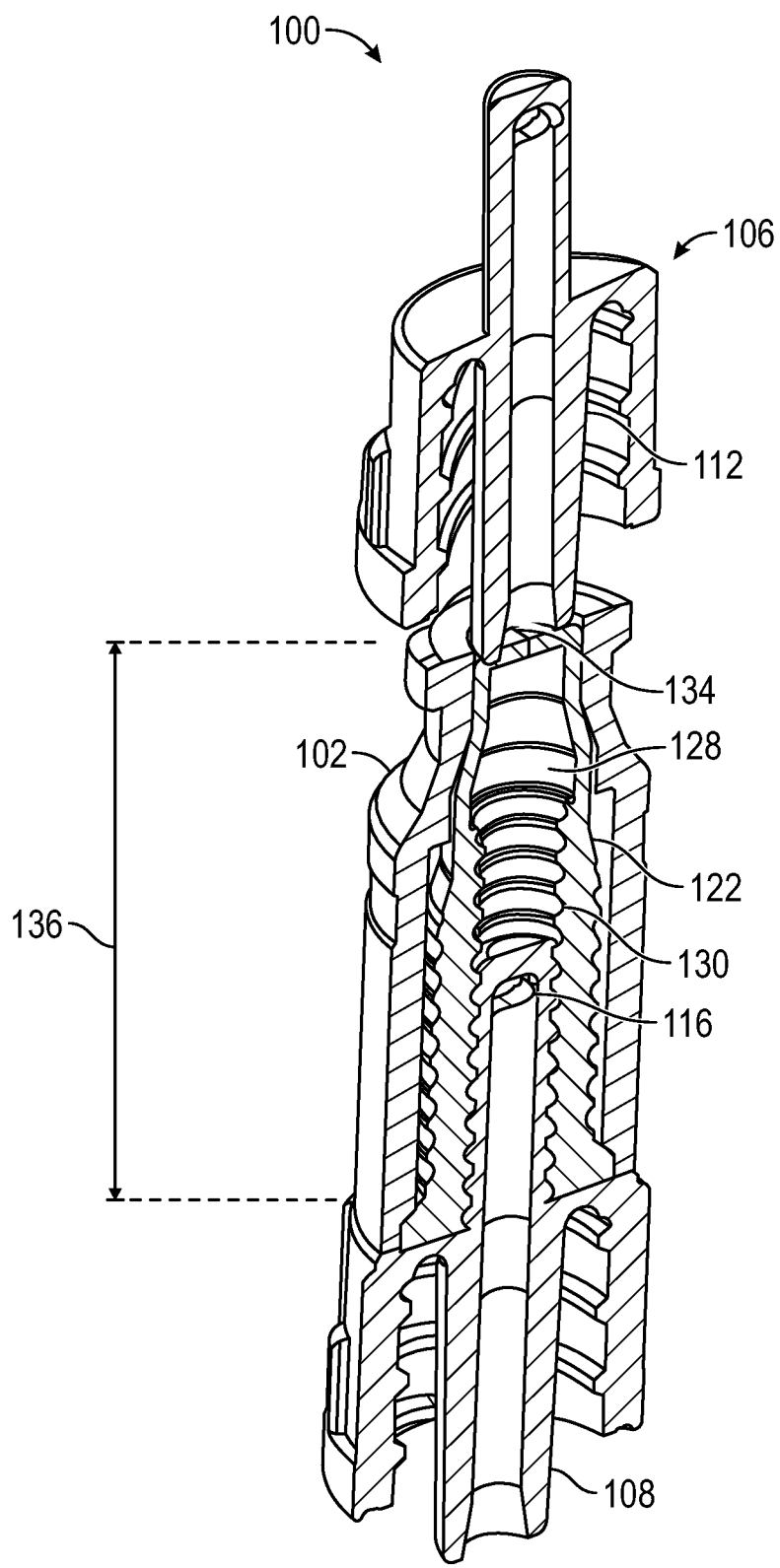
FIG. 6 illustrates a partial cross-sectional view of the fluid connector assembly, showing the connector removed from the housing, in accordance with aspects of the present disclosure.

FIG. 6 illustrates a partial cross-sectional view of the fluid connector assembly 100, showing the connector 106 removed from the housing 102, in accordance with aspects of the present disclosure. Based on the removal of the connector 106, the compressible member 122 expands and returns to its original shape and size. In this regard, the compressible member 122 returns to having the dimension 136, representing the original lengthwise dimension of the compressible member 122 prior to displacement by the post 112 of the connector 106. Further, the slit 134 of the compressible member 122 closes after removal of the connector 106, and the slit 134 prevents fluid passage therethrough. Additionally, the internal volume 128 of the compressible member 122 returns to its prior, uncompressed volume and the inner surface 130 of the compressible member 122 covers the opening 116 of the post 108 to again seal the opening 116.

Figure 7:
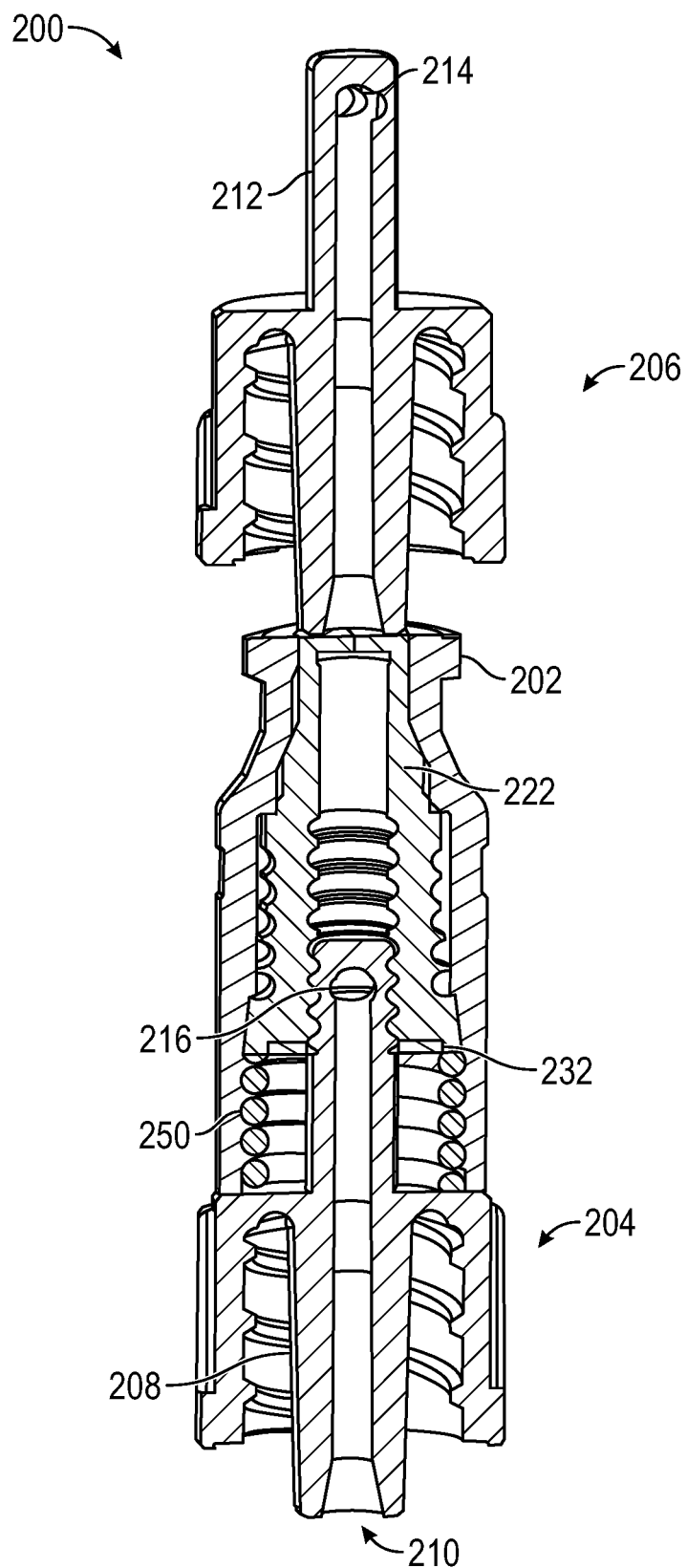
FIG. 7 illustrates a partial cross-sectional view of an alternate embodiment of a fluid connector assembly, showing a biasing component integrated with the fluid connector assembly, in accordance with aspects of the present disclosure.

FIG. 7 illustrates a partial cross-sectional view of an alternate embodiment of a fluid connector assembly 200, showing a biasing component 250 integrated with the fluid connector assembly 200, in accordance with aspects of the present disclosure. The fluid connector assembly 200 may include any structure(s), and associated feature(s), previously shown and described for fluid connector assemblies, along with additional features described herein. Accordingly, the fluid connector assembly 200 may provide neutral fluid displacement.

As shown, the fluid connector assembly 200 includes a housing 202, a connector 204, and a connector 206. The fluid connector assembly 200 further includes a compressible member 222 disposed in an internal volume (not labeled) of the housing 202. The connector 204 includes a post 208 that is at least partially disposed in the housing 202 and the compressible member 222. Also, the connector 206 includes a post 212 having an opening 214 that forms a fluid inlet for the fluid connector assembly 200. While the post 212 is not disposed in the housing 202 and does not displace the compressible member 222 in FIG. 7, the post 212 may engage and displace, or at least substantially displace, the compressible member 222 (for example, see post 112 and compressible member 122 in FIG. 5). Also, the connector 204 includes a post 208 having an opening 216. Also, the post 208 includes a fluid outlet 210 for the fluid connector assembly 200. Additionally, the compressible member 222 includes a septum 232 that provides a liquid-sealing structure that forms a seal between the post 208 and the compressible member 222 to prevent fluid leakage between the post 208 and the compressible member 222. In some embodiments, the septum 232 can be integrated with the compressible member 222, and in some embodiments, the septum 232 may be separated from the compressible member 222.

As shown, the biasing component 250 is located in the housing 202. The biasing component 250 may include a spring or other flexible structure designed to elastically compress. The biasing component 250 is designed to increase the stiffness of the septum 232 of the compressible member 222. By integrating the biasing component 250, the effective spring constant of the compressible member 222 increases, thus requiring an increased force acting on the compressible member 222 to displace the compressible member 222. In this regard, the biasing component 250 can increase the overall sealing capabilities of the compressible member 222, as the compressible member 222 increases in stiffness and provides a greater counter-resistance to displacement by, for example, the post 212 of the connector 206.

Figure 8:
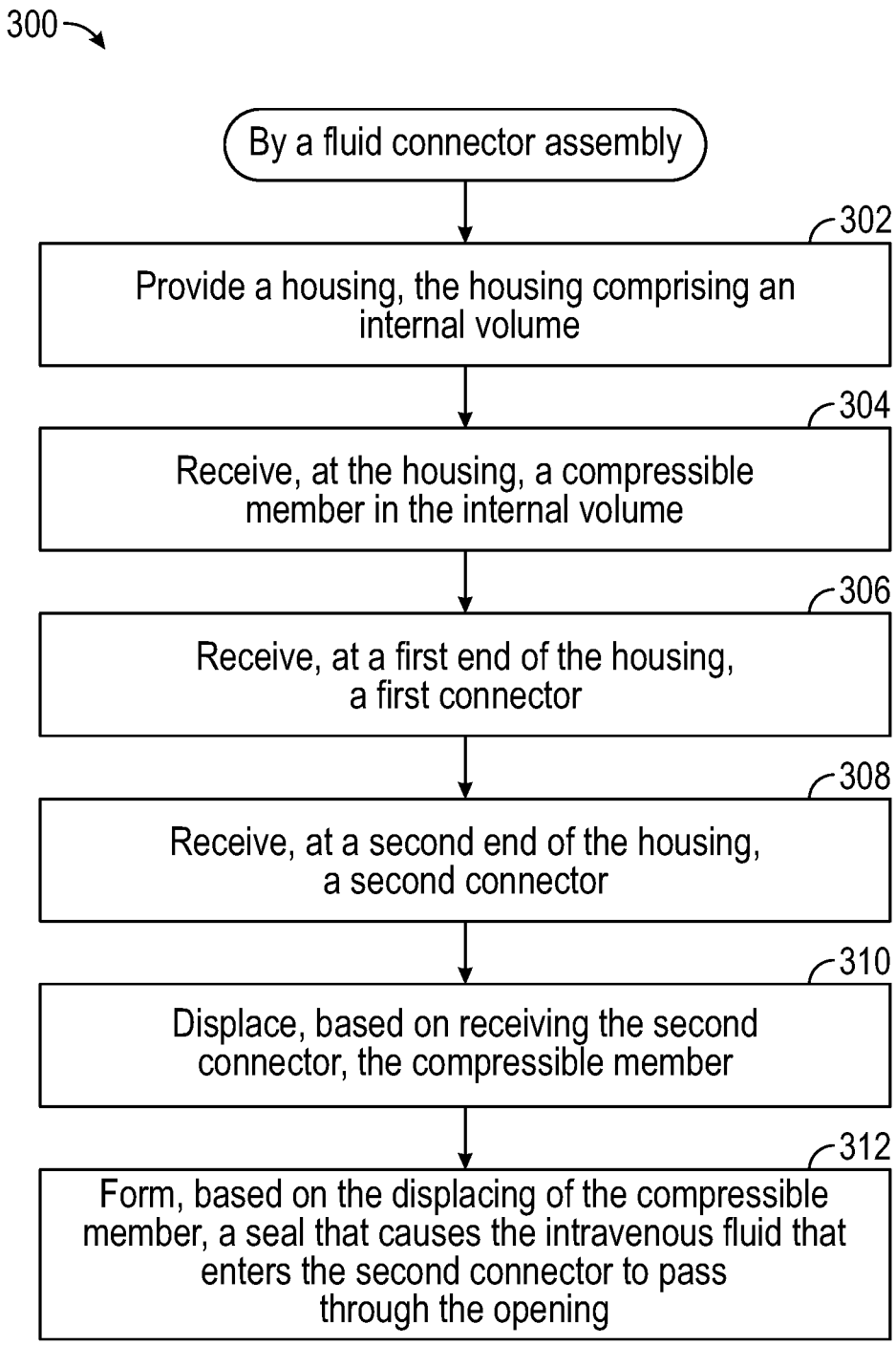
FIG. 8 illustrates a flowchart showing a method for regulating an intravenous fluid, in accordance with aspects of the present disclosure.

FIG. 8 illustrates a flowchart 300 showing a method for regulating an intravenous fluid, in accordance with aspects of the present disclosure. Fluid connector assemblies shown or described herein are capable of carrying out the steps of the method shown in the flowchart 300. In this regard, fluid connector assemblies with neutral fluid displacement may carry the steps of the method shown in the flowchart 300.

In step 302, a housing is provided. The housing may act as a central body for the fluid connector assembly. The housing may include an internal volume designed to receive, or at least partially receive, one or more components of the fluid connector assembly.

In step 304, a compressible member is received at the housing. Further, the compressible member is received in the internal volume of the housing. The compressible member may include a bellow. Further, the compressible member may elastically compress based on an external force and return to its original shape after the external force is removed.

In step 306, a first connector is received at a first end of the housing. The first connector may include a post and an opening formed in the post. The post, including the opening of the post, can be inserted into the housing, and also inserted into the compressible member. Also, the post of the first connector may form a fluid outlet for the fluid connector assembly.

In step 308, a second connector is received at a second end of the housing. The second connector may include a post that engages the compressible member. Also, the post of the second connector may include an opening that forms a fluid inlet for the fluid connector assembly.

In step 310, the compressible member is displaced based on receiving the second connector. The displacement of the compressible member may include a compression that causes a dimension (e.g., length) of the compressible member to reduce. However, based on the elastic features of the compressible member, the compressible member may return to its original size and shape when the second connector no longer engages the compressible member.

In step 312, a seal is formed based on the displacing of the compressible member. The seal causes the intravenous fluid entering the second connector to pass through the opening of the post of the first connector. Further, the seal promotes neutral fluid displacement by limiting or preventing blood and/or other fluids from entering a catheter lumen when a connection or disconnection with the fluid connector assembly occurs. Also, the fluid within the fluid connector assembly does not extend into the internal volume of the housing and does not contact the inner surface of the housing.

Also, based on the location of the posts of the first and second connectors within the housing, the posts do not overlap each other. Put another way, the post of the first connector ("first post") does not enter the post of the second connector ("second post"), and the second post does not surround the first post. In this regard, a gap, located along a longitudinal axis of the first and second posts, provides a separation between the first and second posts, thus minimizing the likelihood of contact between the posts that can cause damage to at least one of the first and second posts.

The features of the present disclosure provide a fluid connector assembly with a compressible member that can be displaced to form a fluid pathway therebetween. When a first and a second connector are coupled together with a housing that carries the compressible member, the compressible member can compress and allow fluid flow, while also providing multiple seals to prevent unwanted fluid leakage. However, if a connector that displaces the compressible member is removed, whether unintentionally or intentionally, the fluid pathway the fluid connector assembly closes or is obstructed to prevent fluid loss therefrom, as the compressible member returns to its uncompressed state and closes off the fluid pathway. The features of the present disclosure also provide that upon separation of the first and second connectors, any of the first and second connectors can be cleaned and disinfected, and the first and second connectors can be once again coupled together to cause the compressible member to form a fluid pathway therebetween.

Illustration of Subject Technology as Clauses

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1, clause 8 or clause 15. The other clauses can be presented in a similar manner.

Clause 1. A fluid connector assembly, comprising: a housing, comprising: a first end, a second end, and an internal volume fluidly connected to the first end and the second end, and a compressible member disposed in the internal volume, the compressible member comprising a cavity; a first connector secured with the housing at the first end, the first connector comprising: a post located in the cavity, and an opening formed in the post; and a second connector, when secured with the housing at second end, displaces the compressible member and forms a seal that causes a fluid entering the second connector to pass through the opening.

Clause 2. The fluid connector assembly of Clause 1, wherein; the seal comprises a first seal, and the second connector and the compressible member form a second seal.

Clause 3. The fluid connector assembly of Clause 2, wherein the compressible member comprises a slit that opens and is sealed by the second seal.

Clause 4. The fluid connector assembly of Clause 2, wherein: the housing comprises an inner surface, and the first seal and the second seal prevent the fluid from contact the inner surface.

Clause 5. The fluid connector assembly of Clause 1, wherein: the post comprises a first post disposed in the housing, the second connector comprises a second post, and the first post does not overlap the second post.

Clause 6. The fluid connector assembly of Clause 5, wherein the compressible member is positioned between the first post and the second post.

Clause 7. The fluid connector assembly of Clause 1, wherein the second connector compresses the compressible member from a first dimension to a second dimension less than the first dimension.

Clause 8. A fluid connector assembly, comprising: a housing comprising an internal volume; a compressible member disposed in the internal volume, the compressible member comprising: an inner wall, and a cavity defined by the inner wall; a first connector secured with the housing, the first connector comprising: a post located in the cavity, and an opening formed in the post, the opening covered by the inner wall; and a second connector, wherein: a first position of the second compressible member comprises the inner wall covering the opening, and a second position of the second compressible member comprises the inner wall uncovering the opening based upon the second connector.

Clause 9. The fluid connector assembly of Clause 8, wherein: the post comprises a first post disposed in the housing, the second connector comprises a second post, and the first post does not overlap the second post.

Clause 10. The fluid connector assembly of Clause 9, wherein the first post and the second post are separated by a gap.

Clause 11. The fluid connector assembly of Clause 10, wherein the compressible member comprises a slit located in the gap.

Clause 12. The fluid connector assembly of Clause 8, wherein the connector forms: a first seal with the first connector, and a second seal with the second connector seal.

Clause 13. The fluid connector assembly of Clause 12, wherein: the inner wall comprises a first inner wall, the housing comprises a second inner wall the defines the internal volume, and a fluid entering the second connector is prevented from contacting the second inner wall based on the first seal and the second seal.

Clause 14. The fluid connector assembly of claim 12, wherein the first seal and the second seal cause a fluid entering the second connector to pass through the opening.

Clause 15. A method for regulating an intravenous fluid, the method comprising, by a fluid connector assembly: providing a housing, the housing comprising an in internal volume; receiving, at the housing, a compressible member in the internal volume; receiving, at a first end of the housing, a first connector, the first connector comprising a post and an opening formed in the post; receiving, at a second end of the housing, a second connector; displacing, based on receiving the second connector, the compressible member; and forming, based on the displacing of the compressible member, a seal that causes the intravenous fluid that enters the second connector to pass through the opening.

Clause 16. The method of Clause 15, wherein forming the seal comprises forming a first seal, and wherein the method further comprises: forming, by the second connector and the compressible member, a second seal.

Clause 17. The method of Clause 16, further comprising directing, based on the first seal and the second seal, the intravenous fluid though the compressible member such that the intravenous fluid does not contact an inner surface of the housing.

Clause 18. The method of Clause 15, wherein: the post comprises a first post, the second connector comprises a second post, and receiving the first connector and the second connector comprises separating maintaining a separation from the first post and the second post.

Clause 19. The method of Clause 18, wherein maintaining the separation comprises positioning the second post in a non-overlapping manner with the first post.

Clause 20. The method of Clause 15, wherein displacing the second connector comprises compressing the compressible member from a first dimension to a second dimension less than the first dimension.

Further Considerations

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A fluid connector assembly, comprising:
    a housing, comprising:
        a first end,
        a second end, and
        an internal volume fluidly connected to the first end and the second end, and
    a compressible member disposed in the internal volume, the compressible member comprising a bellows shape and forming a cavity;

a first connector secured with the housing at the first end, the first connector comprising:
    a post having a distal-most end located in the cavity, the distal-most end of the post comprising a continuous surface, and
    an opening formed in the post;
a septum forming a seal between the post and the compressible member; and
a second connector, when secured with the housing at the second end, displaces the compressible member and forms a first seal between the second connector and the compressible member such that a fluid can move between the second connector and the opening of the post.

2. The fluid connector assembly of claim 1, wherein a second seal is formed between the compressible member and the post.

3. The fluid connector assembly of claim 2, wherein the compressible member comprises a slit that is in an open position when the second connector is secured with the housing opens.

4. The fluid connector assembly of claim 2, wherein:
the housing comprises an inner surface, and
the first seal and the second seal prevent the fluid from contacting the inner surface.

5. The fluid connector assembly of claim 1, wherein:
the post comprises a first post disposed in the housing,
the second connector comprises a second post, and
the first post does not overlap the second post.

6. The fluid connector assembly of claim 5, wherein the compressible member is positioned between the first post and the second post.

7. The fluid connector assembly of claim 1, wherein the second connector compresses the compressible member from a first dimension to a second dimension less than the first dimension.

8. A fluid connector assembly, comprising:
a housing comprising an internal volume;
a compressible member disposed in the internal volume, the compressible member comprising a bellows shape and an inner wall and a cavity defined by the inner wall;
a first connector secured with the housing, the first connector comprising:
    a post having a distal-most end located in the cavity, the distal-most end of the post comprising a continuous surface, and
    an opening formed in the post, the opening covered by the inner wall; and
a second connector; and
a septum forming a seal between the post and the compressible member,
wherein a first position of the compressible member comprises the inner wall covering the opening, and a second position of the compressible member comprises the inner wall uncovering the opening based upon the second connector.

9. The fluid connector assembly of claim 8, wherein:
the post comprises a first post disposed in the housing,
the second connector comprises a second post, and
the first post does not overlap the second post.

10. The fluid connector assembly of claim 9, wherein the first post and the second post are separated by a gap.

11. The fluid connector assembly of claim 10, wherein the compressible member comprises a slit located in the gap.

12. The fluid connector assembly of claim 8, wherein
a first seal is formed between the second connector and the compressible member, and
a second seal is formed between the compressible member and the post.

13. The fluid connector assembly of claim 12, wherein:
the inner wall comprises a first inner wall,
the housing comprises a second inner wall that defines the internal volume, and
a fluid entering the second connector is prevented from contacting the second inner wall based on the first seal and the second seal.

14. The fluid connector assembly of claim 12, wherein at least a portion of a fluid path between the first connector and the second connector, and through the opening of the post, is formed by the first seal and the second seal.

15. A method for regulating an intravenous fluid, the method comprising, by a fluid connector assembly:
providing a housing, the housing comprising an internal volume;
receiving, at the housing, a compressible member in the internal volume, the compressible member comprising a bellows shape;
receiving, at a first end of the housing, a first connector, the first connector comprising a post having a distal-most end with a continuous surface and an opening formed in the post between the distal-most end and a proximal end of the post, such that the distal-most end of the post is positioned within a cavity of the compressible member;
providing a septum forming a seal between the post and the compressible member;
receiving, at a second end of the housing, a second connector;
displacing, based on receiving the second connector in a direction toward the post, the compressible member; and
forming, based on the displacing of the compressible member, a seal between the second connector and the compressible member such that that the intravenous fluid can move between the second connector and the opening of the post.

16. The method of claim 15, wherein forming the seal comprises forming a first seal, and wherein the method further comprises:
forming, by the second connector and the compressible member, a second seal.

17. The method of claim 16, further comprising directing, based on the first seal and the second seal, the intravenous fluid though the compressible member such that the intravenous fluid does not contact an inner surface of the housing.

18. The method of claim 15, wherein:
the post comprises a first post,
the second connector comprises a second post, and
receiving the first connector and the second connector comprises maintaining a gap between the distal-most end of the first post and the second post.

19. The method of claim 18, wherein maintaining the gap comprises positioning the second post in a non-overlapping manner with the first post.

* * * * *